US011958286B2

(12) United States Patent
Beniya et al.

(10) Patent No.: US 11,958,286 B2
(45) Date of Patent: Apr. 16, 2024

(54) PRINTER

(71) Applicant: FUJITSU COMPONENT LIMITED, Tokyo (JP)

(72) Inventors: Katsuhisa Beniya, Tokyo (JP); Hiroyuki Kataoka, Tokyo (JP); Taichi Sakakura, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 107 days.

(21) Appl. No.: 17/931,601

(22) Filed: Sep. 13, 2022

(65) Prior Publication Data

US 2023/0128361 A1 Apr. 27, 2023

(30) Foreign Application Priority Data

Oct. 26, 2021 (JP) ................................ 2021-174548

(51) Int. Cl.
*B41J 11/66* (2006.01)

(52) U.S. Cl.
CPC .................................. *B41J 11/663* (2013.01)

(58) Field of Classification Search
CPC . B41J 11/663; B41J 11/70; B41J 11/68; B41J 11/703; B41J 3/4075; B26D 5/20; B65H 2701/13
See application file for complete search history.

(56) References Cited

U.S. PATENT DOCUMENTS

2020/0269612 A1* 8/2020 Tokuda .................... B41J 11/70

FOREIGN PATENT DOCUMENTS

| | | |
|---|---|---|
| JP | H04-360454 | 12/1992 |
| JP | 2002-128378 | 5/2002 |
| JP | 2002-338130 | 11/2002 |
| JP | 2009-298095 | 12/2009 |
| JP | 2019-034565 | 3/2019 |

* cited by examiner

*Primary Examiner* — Thinh H Nguyen
(74) *Attorney, Agent, or Firm* — IPUSA, PLLC

(57) ABSTRACT

A printer includes a transport part that transports a sheet, a printing part that prints on the sheet, a cutting part that cuts the sheet by moving a movable blade toward a stationary blade, and a controller that controls the transport part and the cutting part. When the sheet is label paper having an adhesive layer, the controller controls the transport part and the cutting part to transport the sheet rearward before moving the movable blade that cut the sheet, move the movable blade in a direction away from the stationary blade in a state where the sheet is fed in rearward, and thereafter transport the sheet frontward.

4 Claims, 8 Drawing Sheets

PRINTER

CROSS-REFERENCE TO RELATED APPLICATIONS

This application is based upon and claims the benefit of priority of the prior Japanese Patent Application No. 2021-174548, filed on Oct. 26, 2021, the entire contents of which are incorporated herein by reference.

TECHNICAL FIELD

A certain aspect of the embodiments is related to a printer.

BACKGROUND

Japanese Laid-Open Patent Publication No. 2002-128378 discloses a technique that partially cuts a sheet using a stationary blade and a movable blade provided with a cutout, and thereafter reverse line-feeds and fully cuts the sheet before retreating the movable blade.

Japanese Laid-Open Patent Publication No. H04-360454 discloses a technique that cuts a sheet by a movable blade, and transports the sheet in a reverse direction before retreating the movable blade to a standby position.

There is a known printer that print on label paper having a plurality of mutually separated labels connected on release paper, and cuts only the release paper. A printer capable of producing a label having an arbitrary size, by printing on label paper having a continuous adhesive layer, is desired.

SUMMARY

A printer according to one embodiment includes a transport part configured to transport a sheet; a printing part configured to print on the sheet; a cutting part configured to cut the sheet by moving a movable blade toward a stationary blade; and a controller configured to control the transport part and the cutting part, wherein the controller, when the sheet is label paper having an adhesive layer, controls the transport part and the cutting part to transport the sheet rearward before moving the movable blade that cut the sheet, move the movable blade in a direction away from the stationary blade in a state where the sheet is fed in rearward, and thereafter transport the sheet frontward.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, a description will be given of the embodiments of the present invention with reference to the drawings.

When cutting a roll of label paper, if the label paper is cut by the movable blade and the movable blade is returned to a home position, the adhesive layer of the label paper is torn in a moving direction of the movable blade, an adhesive of the adhesive layer easily remains on the movable blade.

One aspect of the embodiments provides a printer that can reduce the adhesive of the label paper from adhering onto the movable blade.

First Embodiment

Figure 1:
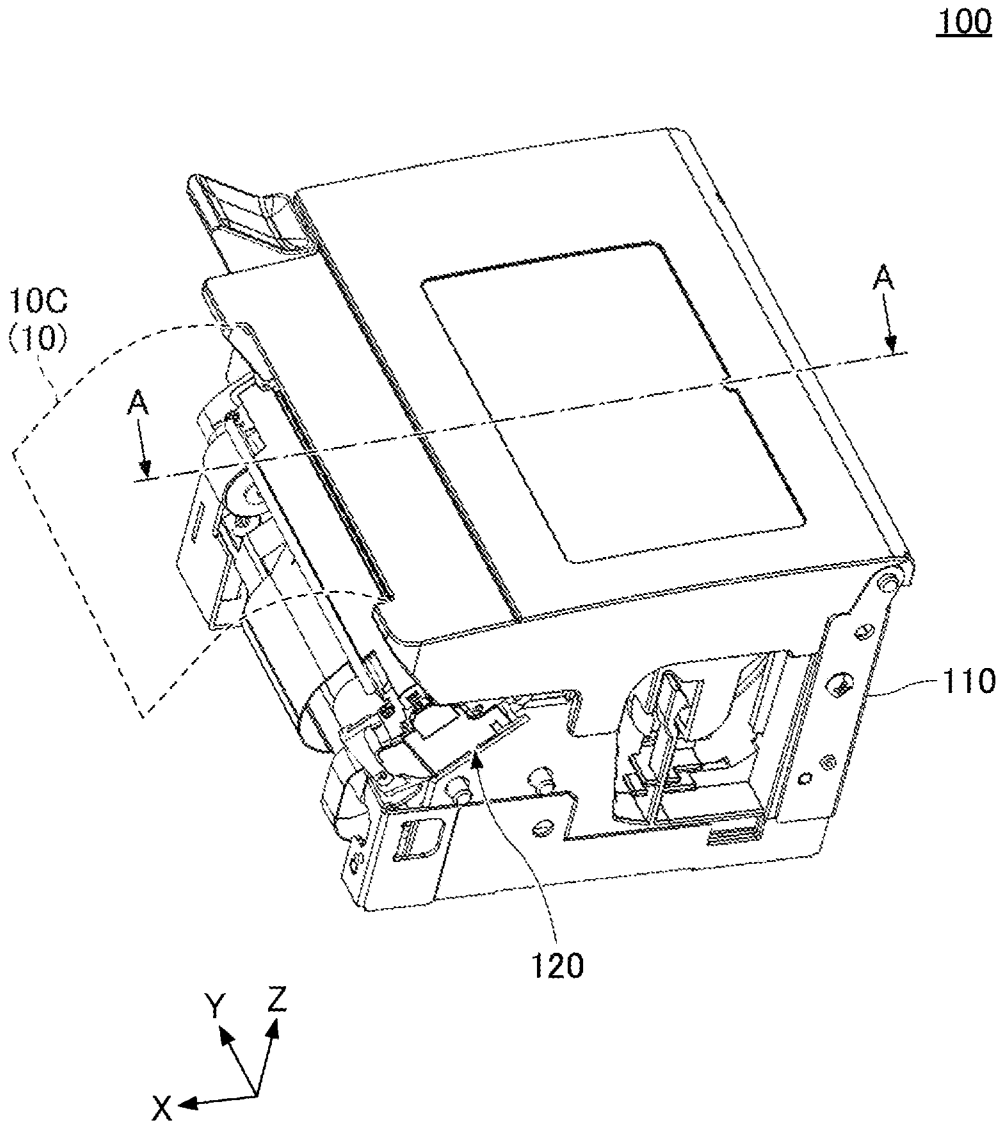
FIG. 1 is an external perspective view of a printer according to a first embodiment.
Figure 2:
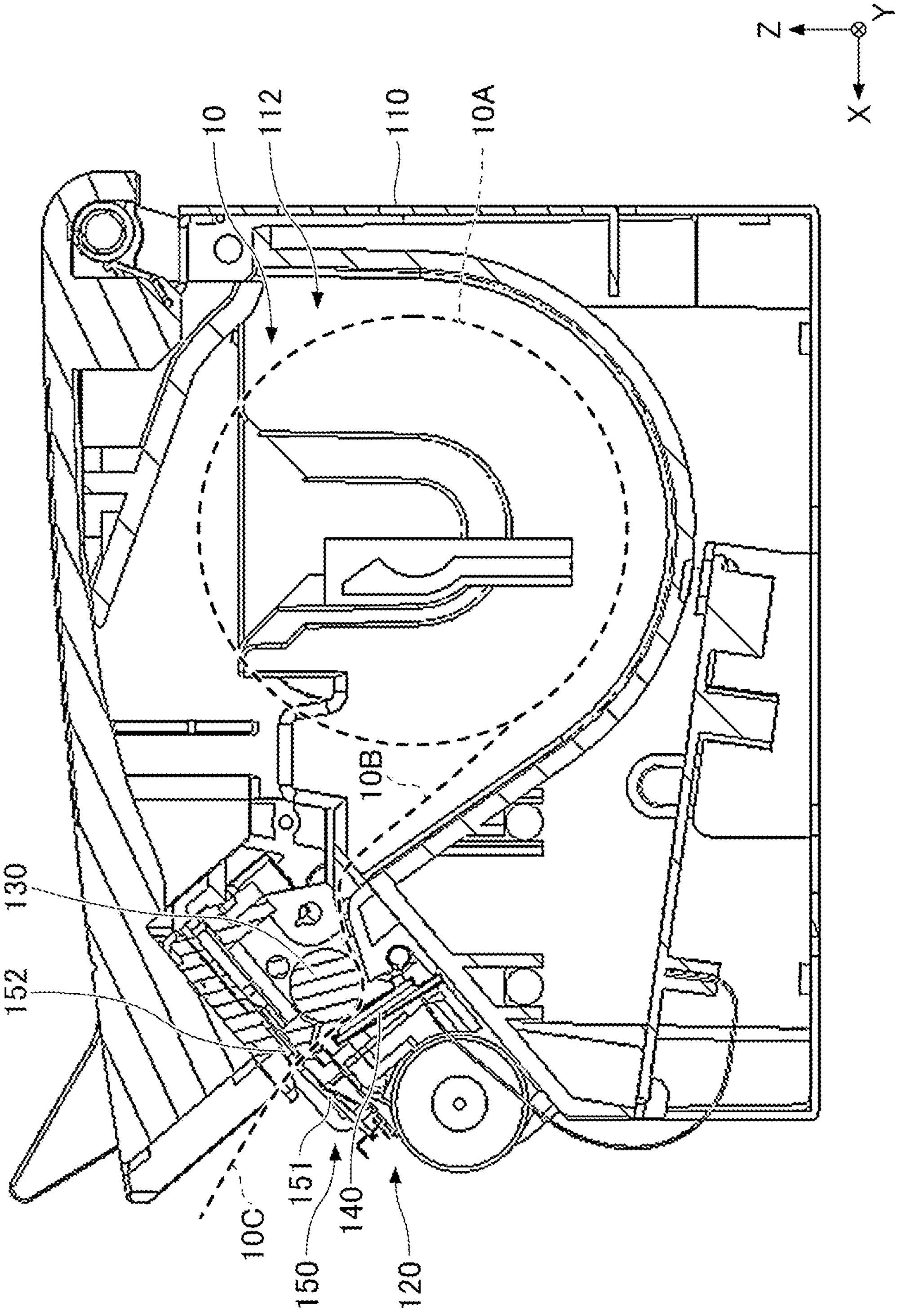
FIG. 2 is a cross sectional view of the printer along a line A-A in FIG. 1.
Figure 3:
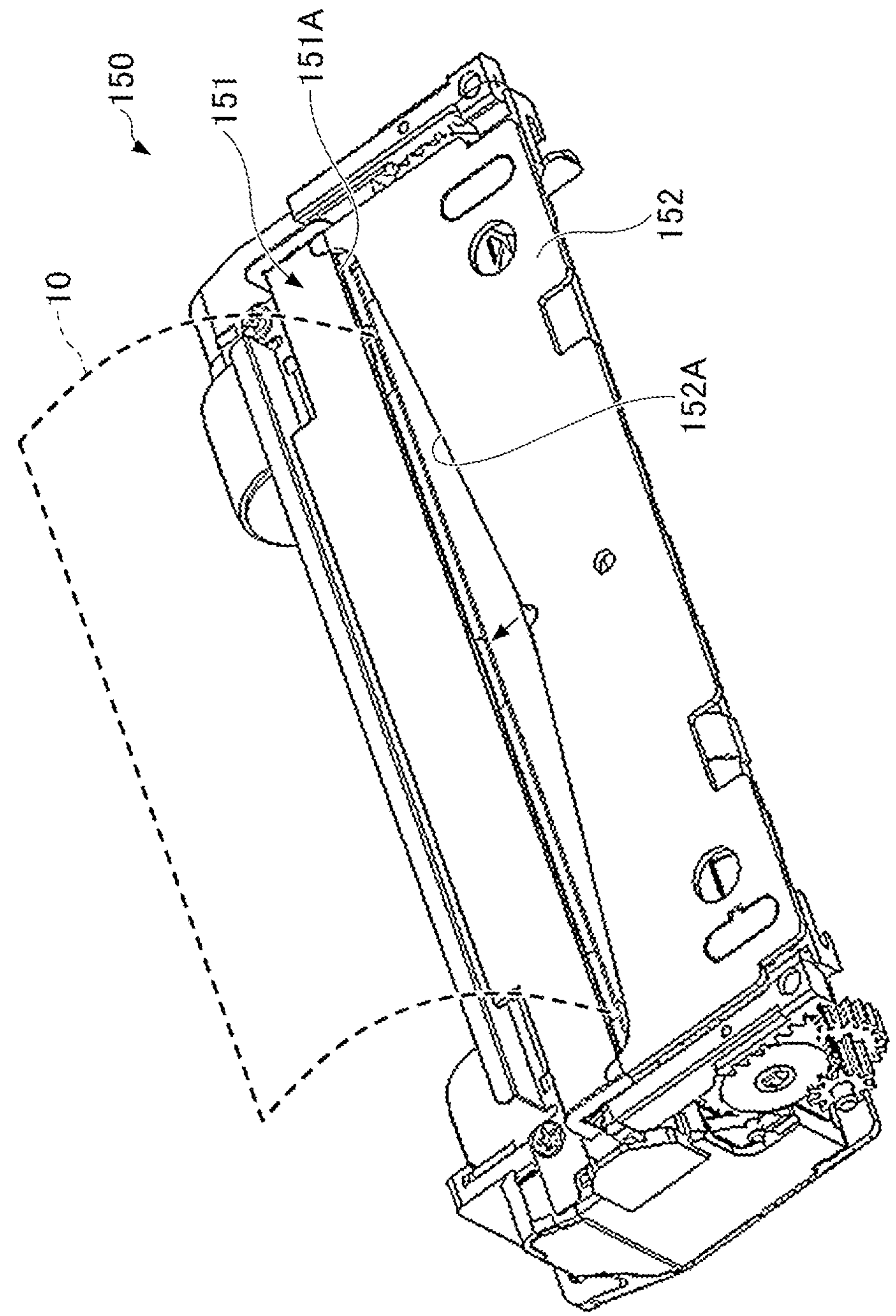
FIG. 3 is an external perspective view of a cutting part.

FIG. 1 is an external perspective view of a printer 100 according to a first embodiment. FIG. 2 is a cross sectional view of the printer 100 along a line A-A in FIG. 1. FIG. 3 is an external perspective view of a cutting part 150 provided in the printer 100. The printer 100 illustrated in FIGS. 1 and 2 performs printing on a sheet 10 and cutting of the sheet 10, and is capable of making a full cut.

Hereinafter, an X-axis direction refers to a back-forth direction, and the +X-direction refers to a frontward direction. A Y-axis direction refers to a right-left direction, and the +Y-direction refers to a rightward direction. A Z-axis direction refers to an up-down direction, and the +Z-direction refers to an upward direction.

The printer 100 illustrated in FIGS. 1 through 3 includes a case 110, and a print unit 120.

The case 110 has a hollow box shaped configuration. The print unit 120 is disposed at the front inside the case 110. A holder 112 for holding a roll of the sheet 10 is disposed at the rear inside the case 110.

For the sake of convenience, the sheet 10 will be described separately for a roll 10A of the sheet 10, a drawn-out portion 10B drawn out to the front from the roll 10A, and a printed portion 10C that is printed. Thermal recording paper that can be printed by heat, can be used for the sheet 10. In the present embodiment, label paper having an adhesive layer, and a plain paper having no adhesive layer, can be used for the sheet 10.

The print unit 120 includes a roller 130 (an example of a transport part) for transporting the sheet 10, a thermal head 140 (an example of a printing part), and a cutting part 150.

The roller 130 is pressed against an upper surface of the drawn-out portion 10B, and is rotated by a transport motor (not illustrated) to transport the sheet 10. The roller 130 transports the sheet 10 frontward when the transport motor is rotated in a forward direction, and transports the sheet 10 rearward when the transport motor is rotated in a reverse direction.

The thermal head 140 includes a plurality of heating elements (not illustrated) disposed in a width direction of the sheet 10. The thermal head 140 heats the sheet 10 by the heating elements, and prints an image on the sheet 10.

The cutting part 150 includes a stationary blade 151 made of a metal and having a flat shape, and a movable blade 152, for example. A cutting edge 151A of the stationary blade 151, and a cutting edge 152A of the movable blade 152, are both greater than the width of the sheet 10.

The stationary blade 151 and the movable blade 152 are disposed so that the respective cutting edges 151A and 152A oppose each other. The movable blade 152 is driven by a cut motor (not illustrated), and is movable in a direction toward and in a direction away from the stationary blade 151. The cutting part 150 moves the movable blade 152 toward the stationary blade 151, and presses the movable blade 152 down toward the sheet 10 at a cutting position 150A (refer to FIG. 6A described later) between the cutting edge 151A and the cutting edge 152A. Accordingly, a rear end of the printed portion 10C is pinched between and cut by the cutting edges 151A and 152A, and the printed portion 10C is cut off from the sheet 10.

As illustrated in FIG. 3, the cutting edge 151A has a linear shape, while the cutting edge 152A has a concave V-shape that caves in from both ends of the movable blade 152 toward a center thereof so as to separate further away from the stationary blade 151. Accordingly, when the cutting edge 152A is pressed down, the sheet 10 is cut from both the right and left ends thereof toward the center thereof.

Figure 4:
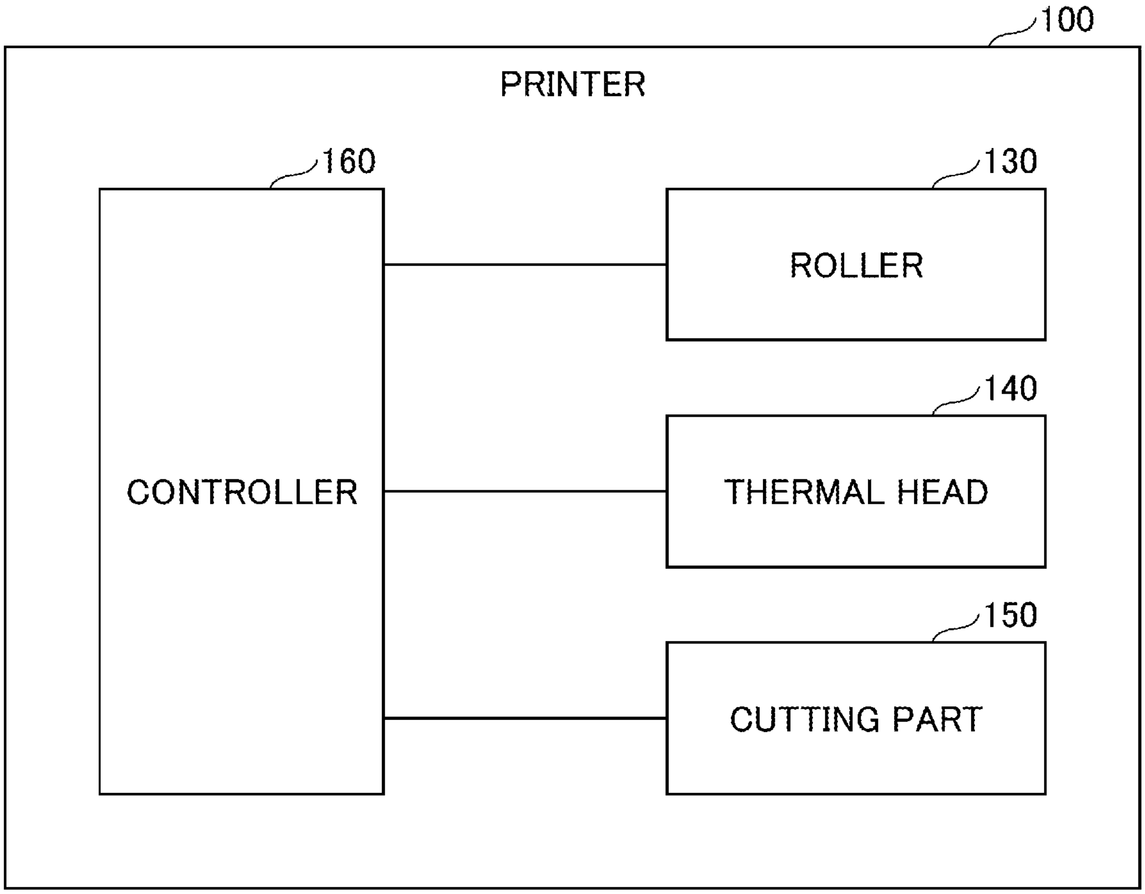
FIG. 4 is a block diagram illustrating a configuration of a control system of the printer.

FIG. 4 illustrates a configuration of a control system of the printer 100. The printer 100 includes a controller 160. The controller 160 controls operations of various parts of the printer 100, including printing to the sheet 10 by the thermal head 140, transporting the sheet 10 by the roller 130, and cutting the sheet 10 by the cutting part 150. For example, the controller 160 includes a processor, a non-volatile memory, or the like. The controller 160 can provide various functions by executing one or more programs stored in the non-volatile memory by the processor.

Figure 5:
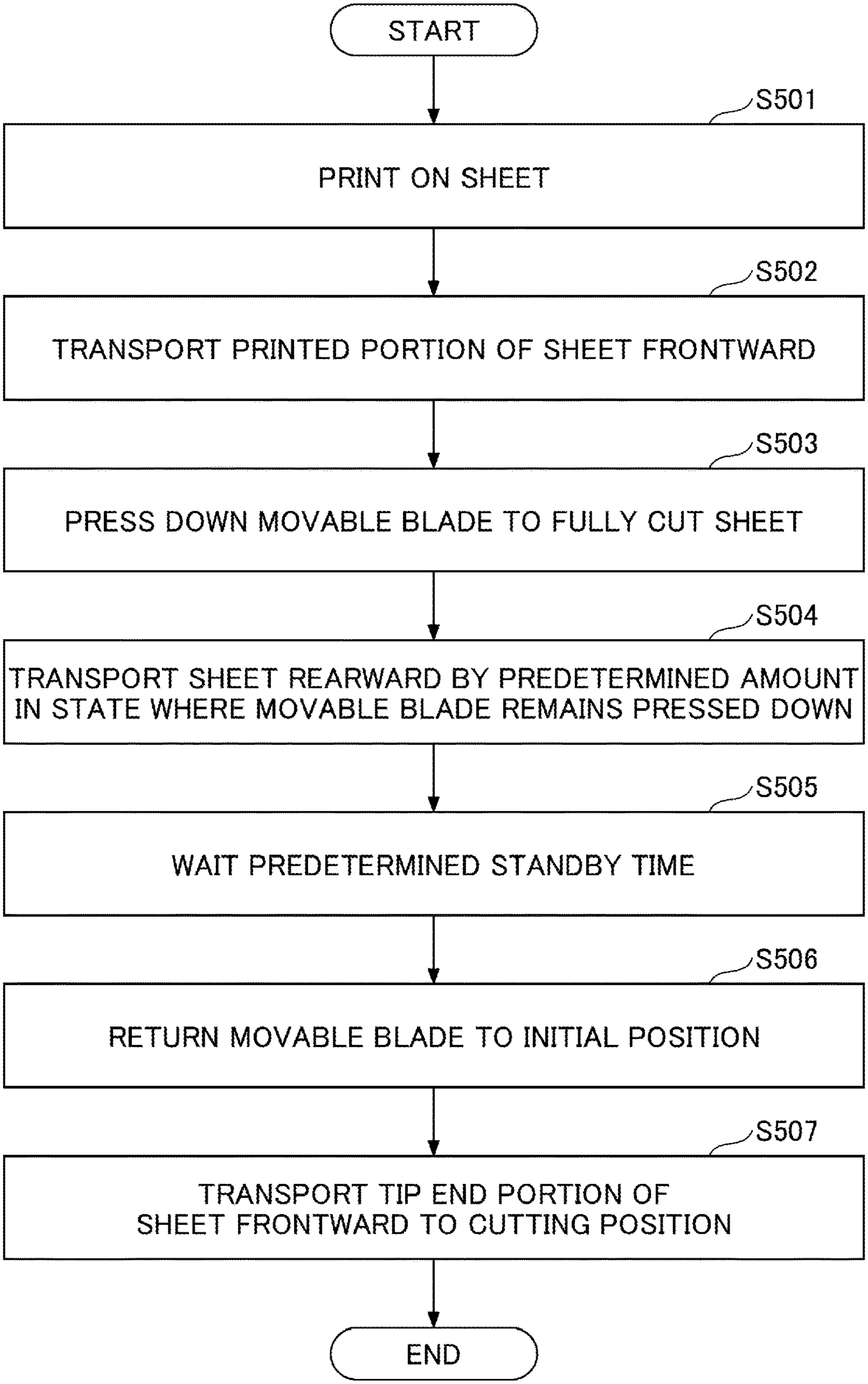
FIG. 5 is a flow chart illustrating a processing procedure of a controller according to the first embodiment.

FIG. 5 illustrates a processing procedure of the controller 160, including steps S501 through S507. FIGS. 6A through 6E illustrate the operation of the printer 100 according to the first embodiment. In the example of the present embodiment, the printer 100 is a printer exclusively for label printing.

Figure 6A:
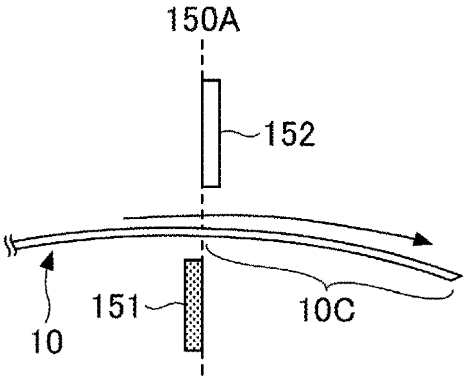
FIGS. 6A, 6B, 6C, 6D, and 6E are diagrams illustrating an operation of the printer.

As illustrated in FIG. 6A, after the controller 160 controls the thermal head 140 to print on the sheet 10 (step S501), the controller 160 controls the roller 130 to transport the sheet 10 frontward to so that the printed portion 10C is located at a position more frontward than the cutting position 150A (step S502). A length of a printing area is variable according to printing contents.

Figure 6B:
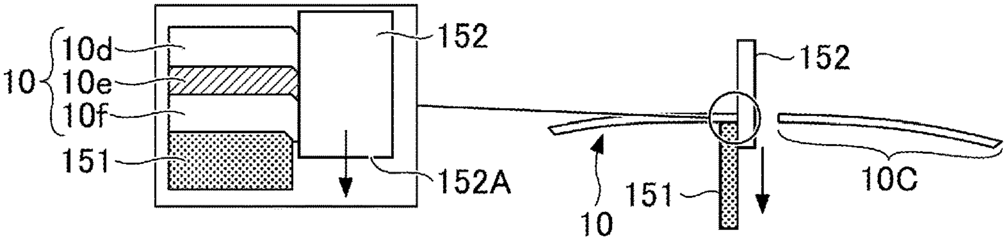

As illustrated in FIG. 6B, the controller 160 controls the movable blade 152 press down toward the stationary blade 151, and cut the rear end of the printed portion 10C (step S503). In the present embodiment, the sheet 10 is fully cut. As a result, the printed portion 10C is cut off from the sheet 10. In this state, as illustrated in FIG. 6B, an adhesive of an adhesive layer 10*e* exposed from a tip end surface of the cut sheet 10 may adhere to a surface of the movable blade 152 on the side closer to the drawn-out portion 10B than to the drawn-out portion 10C. As illustrated in FIG. 6B, the sheet 10 includes a heat sensitive layer 10*d*, the adhesive layer 10*e*, and release paper 10*f*, in this order from the side of a printing surface of the sheet 10.

Figure 6C:
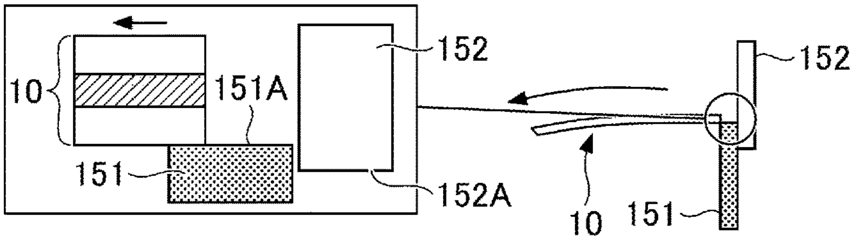

Next, as illustrated in FIG. 6C, the controller 160 controls the roller 130 to transport the sheet 10 rearward by a predetermined amount, in a state where the movable blade 152 remains pressed down, so as to create a gap between the tip end surface of the sheet 10 and the surface of the movable blade 152 on the side closer to the drawn-out portion 10B than to the drawn-out portion 10C (step S504). In this state, the predetermined amount of the sheet 10 fed rearward is at least an amount that can create the gap between the tip end surface of the sheet 10 and the movable blade 152, and a suitable value can be obtained in advance for the predetermined amount by conducting experiments, simulations, or the like.

Thereafter, the controller 160 stands by and waits for a predetermined standby time T (step S505). The standby time T is at least a time that is sufficiently long to enable the adhesive to be completely separated from the movable blade 152, and a suitable value can be obtained in advance for the standby time T by conducting experiments, simulations, or the like.

Figure 6D:
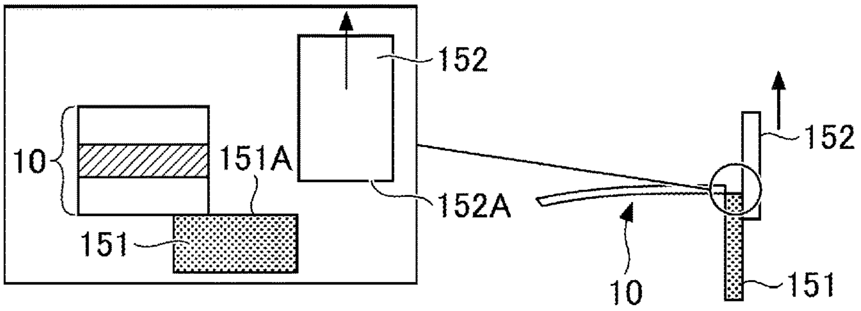

Next, as illustrated in FIG. 6D, the controller 160 controls the movable blade 152 to move in a direction away from the stationary blade 151, to return the movable blade 152 to an initial position (step S506).

Figure 6E:
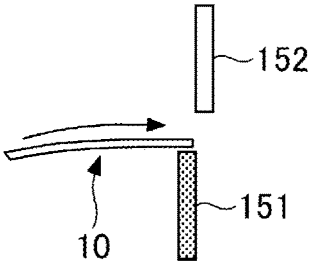

Further, as illustrated in FIG. 6E, the controller 160 controls the roller 130 to transport the tip end of the sheet 10 frontward to the cutting position 150A (step S507). Thereafter, the controller 160 ends the series of processes illustrated in FIG. 5.

Figure 7:
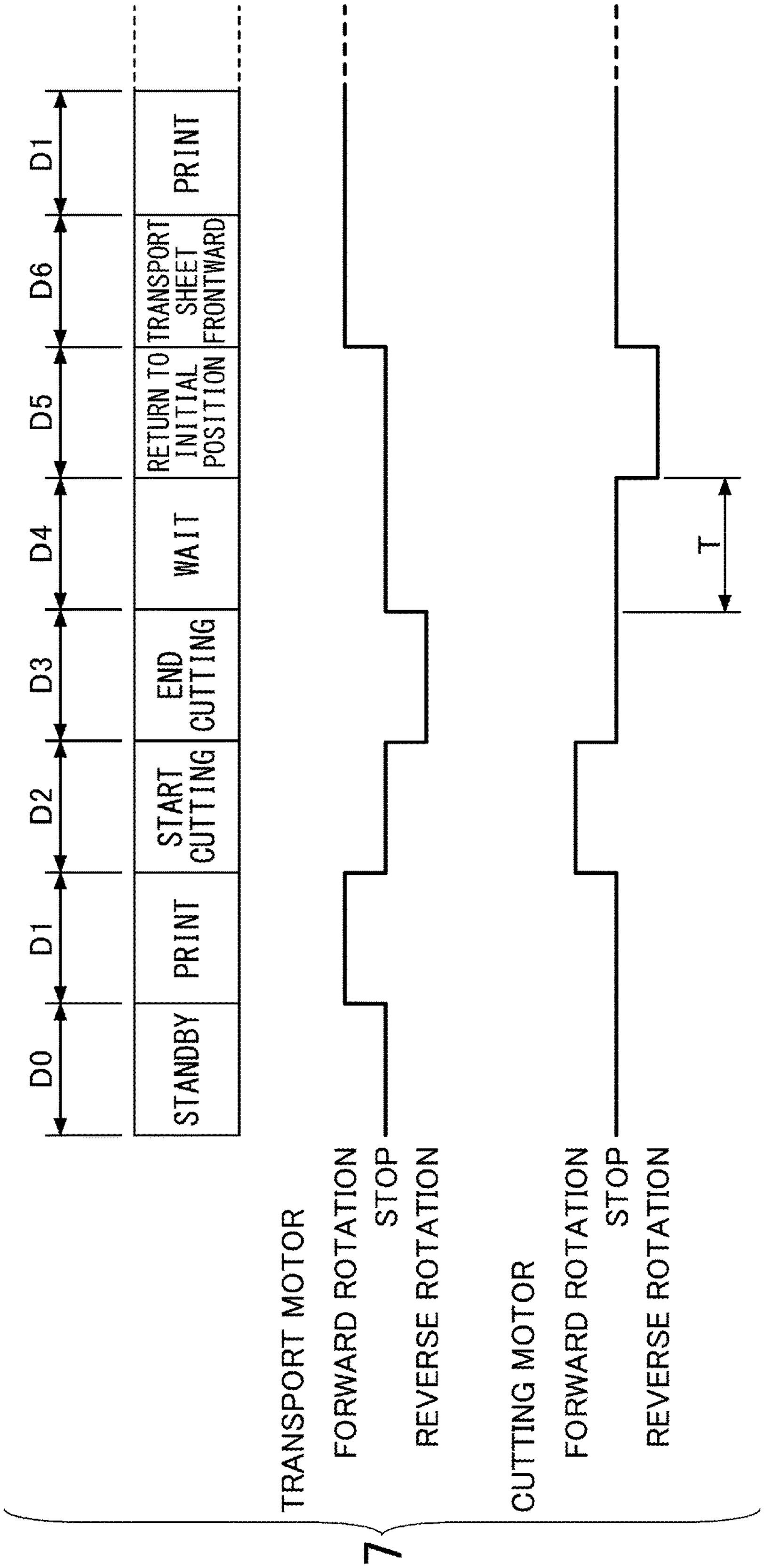
FIG. 7 is a diagram illustrating operation timings of motors.

FIG. 7 illustrates operation timings of motors under the control of the controller 160. FIG. 7 illustrates the operation timing of the transfer motor, and the operation timing of the cut motor. In FIG. 7, D0 through D6 denote periods (or time segments) of the processes of the controller 160.

When the controller 160 stands by during the period D0 after the printer 100 is activated and until a print start instruction is received, and the print start instruction is thereafter received, the controller 160 controls the thermal head 140 to print on the sheet 10 during the period D1 while controlling the transport motor to rotate in the forward direction to transport the sheet 100 frontward.

Next, the controller 160 stops the transfer motor, and also controls the cut motor to rotate in a forward direction to press down the movable blade 152 toward the stationary blade 151, to cut the rear end of the printed portion 10C during the period D2.

Next, the controller 160 stops the cut motor, and also controls the transport motor to rotate in the reverse direction in a state where the movable blade 152 remains pressed down, to transport the sheet 100 rearward by the predetermined amount during the period D3.

Thereafter, the controller 160 stops the transfer motor and stands by and waits for the standby time T during the period D4.

Next, the controller 160 controls the cut motor to rotate in a reverse direction to move the movable blade 152 in the direction away from the stationary blade 151, to return the movable blade 152 back to the initial position during the period D5.

Furthermore, the controller 160 controls the transport motor to rotate in the forward direction and transport the tip end portion of the sheet 10 to the cutting position 150A during the period D6. Thereafter, the controller 160 performs the processes of the period D1 and subsequent periods as a printing process for a next page, as required.

Second Embodiment

Figure 8:
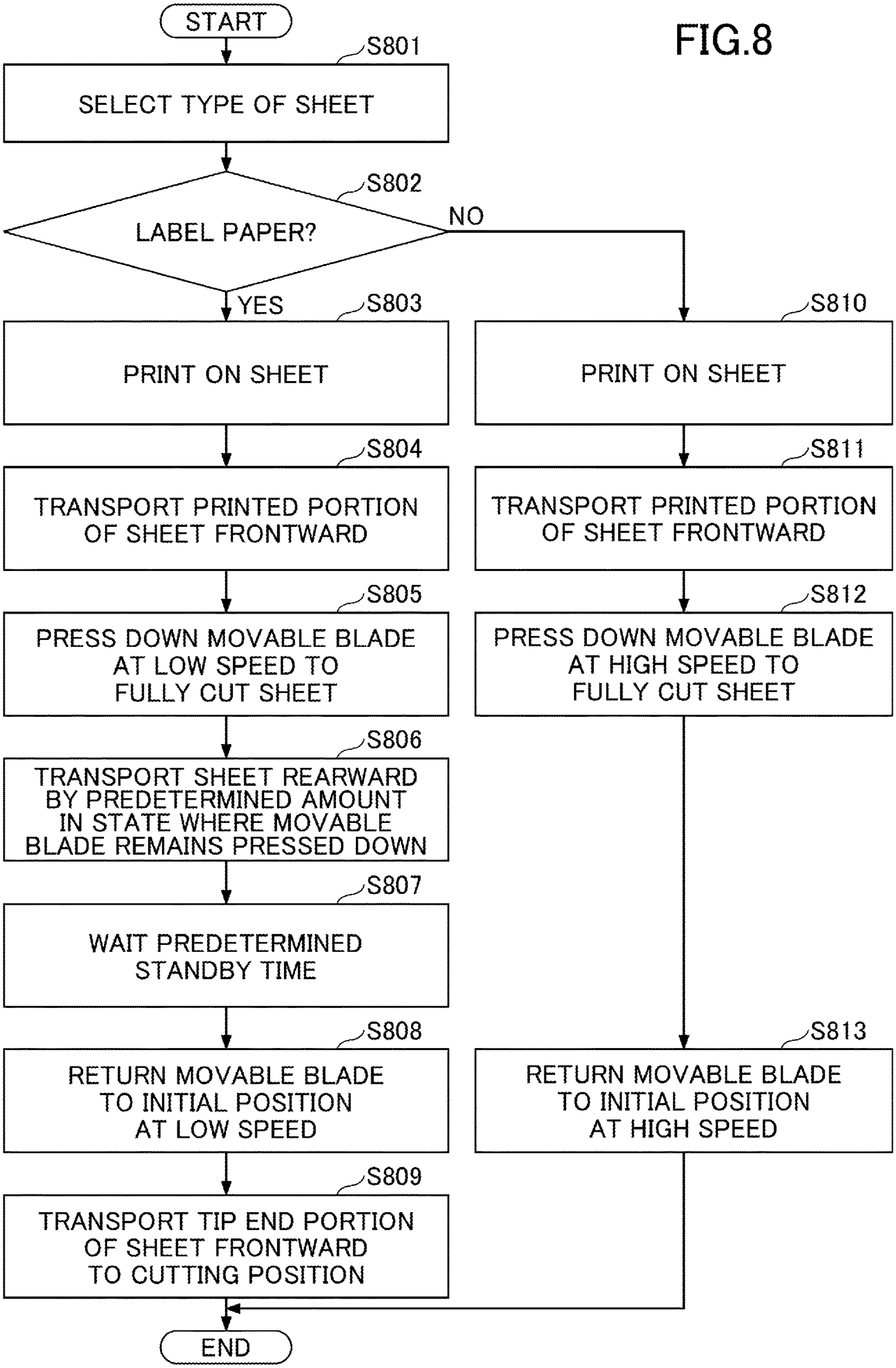
FIG. 8 is a flow chart illustrating a processing procedure of the controller according to a second embodiment.

FIG. 8 illustrates the processing procedure of the controller 160 according to a second embodiment, including steps S801 through S813. The printer 100 according to the second embodiment is a shared printer capable of printing on the label paper and plain paper. In the second embodiment, the processing procedure of the controller 160 is different from that of the first embodiment.

The controller 160 urges a user to select a type of sheet 10 (step S801). The type of sheet 10 may be selected manually by the user, or the sheet 10 may be provided with an identifier, such as symbols, graphics, characters, bar codes, and two-dimensional codes, so as to enable the printer 100 to automatically recognize the type of sheet from the identifier.

Next, the controller 160 determines whether or not the selected type of sheet 10 is label paper (step S802).

When the type of sheet 10 is the label paper (YES in step S802), the controller 160 transports the sheet 10 frontward after printing on the sheet 10 (step S803), and positions the printed portion 10C more frontward than the cutting position 150A (step S804).

Then, the controller 160 presses down the movable blade 152 at a low speed (for example, 1000 pps) toward the stationary blade 151, to cut the rear end of the printed portion 10C (step S805). As a result, the printed portion 10C is separated from the sheet 10.

Next, the controller 160 transports the sheet 10 rearward in the state where the movable blade 152 remains pressed down, to create the gap between the front end of the sheet 10 and the surface of the movable blade 152 (step S806). Thereafter, the controller 160 waits for the standby time T (step S807).

Next, the controller 160 moves the movable blade 152 in the direction away from the stationary blade 151 at a low speed (for example, 1000 pps), to return the movable blade 152 back to the initial position (step S808).

Further, the controller 160 transports the sheet 10 frontward to the cutting position 150A (step S809), and thereafter ends the series of processes illustrated in FIG. 8.

On the other hand, when the type of sheet 10 is the plain paper (NO in step S802), the controller 160 transports the sheet 10 frontward after printing on the sheet 10 (step S810), and positions the printed portion 10C more the frontward than the cutting position 150A (step S811).

Then, the controller 160 presses down the movable blade 152 at a high speed (for example, 3000 pps) toward the stationary blade 151, to fully cut the rear end of the printed portion 10C (step S812). As a result, the printed portion 10C is separated from the sheet 10.

Next, the controller 160 moves the movable blade 152 in the direction away from the stationary blade 151 at a high speed (for example, 3000 pps), to return the movable blade 152 back to the initial position (step S813). Thereafter, the controller 160 ends the series of processes illustrated in FIG. 8.

As described above, the disclosed printer transports the label paper rearward in the state where the movable blade remains pressed down after cutting the label paper, and after moving the movable blade in the direction away from the stationary blade, then transports the label paper frontward. Hence, when returning the movable blade back to the initial position, it is possible to prevent the adhesive exposed from the end surface of the label paper from adhering onto the movable blade. Particularly in a case where the label paper is fed rearward during a standby in which moving the movable blade in the direction away from the stationary blade is waited in the state where the movable blade remains pressed down after cutting the label paper, the adhesive that adheres to the movable blade 152 when the movable blade 152 is pressed down can be released or removed during standby.

The disclosed controller can return the movable blade back to the initial position without transporting the sheet rearward after cutting the sheet, according to the type of sheet, such as the plain paper. Accordingly, the process of transporting the cut sheet rearward after cutting, and the process of transporting the sheet frontward to the cutting position, can be omitted when the plain paper or the like is used, thereby shortening a processing time related to the cutting of the sheet.

In the disclosed printer, a cutting speed of the label paper can be made slower than a cutting speed of the plain paper. In this case, the cutting speed can be reduced when the label paper is used, so that the label paper that is thicker than the plain paper can be cut with a sufficiently large torque. On the other hand, because the cutting speed can be increased when the plain paper is used, the processing time related to cutting of the plain paper can be reduced.

All examples and conditional language provided herein are intended for the purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

Although the embodiments are numbered with, for example, "first," or "second," the ordinal numbers do not imply priorities of the embodiments. Many other variations and modifications will be apparent to those skilled in the art.

What is claimed is:

1. A printer comprising:
- a transport part configured to transport a sheet;
- a printing part configured to print on the sheet;
- a cutting part configured to cut the sheet by moving a movable blade toward a stationary blade; and
- a controller configured to control the transport part and the cutting part,
- wherein the controller, when the sheet is label paper having an adhesive layer, controls the
  - transport part and the cutting part to transport the sheet rearward before moving the movable blade that cut the sheet,
  - move the movable blade in a direction away from the stationary blade in a state where the sheet is fed in rearward, and
  - thereafter transport the sheet frontward.

2. The printer as claimed in claim 1, wherein controller varies a cutting speed of the sheet by the movable blade according to a type of the sheet.

3. A printer comprising:
- a transport part configured to transport a sheet;
- a printing part configured to print on the sheet;
- a cutting part configured to cut the sheet by moving a movable blade toward a stationary blade; and
- a controller configured to control the transport part and the cutting part,
- wherein the controller switches, according to a type of the sheet, between
  - an operation that transports the sheet rearward before moving the movable blade that cut the sheet, moves the movable blade in a direction away from the stationary blade in a state where the sheet is fed in rearward, and thereafter transports the sheet frontward, and
  - an operation that moves the movable blade toward the stationary blade to cut the sheet, and thereafter moves the movable blade in the direction away from the stationary blade without transporting the sheet rearward.

4. The printer as claimed in claim 3, wherein controller varies a cutting speed of the sheet by the movable blade according to the type of the sheet.

* * * * *